(12) United States Patent
Ognjanovic (10) Patent No.: US 8,170,842 B2
(45) Date of Patent: May 1, 2012

(54) FABRIC MODELLING

(75) Inventor: Rade Ognjanovic, Southam (GB)

(73) Assignee: Innoval Technology Limited, Oxfordshire (GB)

( * ) Notice: Subject to any disclaimer, the term of this patent is extended or adjusted under 35 U.S.C. 154(b) by 725 days.

(21) Appl. No.: 11/720,489

(22) PCT Filed: Nov. 29, 2005

(86) PCT No.: PCT/GB2005/050216
§ 371 (c)(1),
(2), (4) Date: Apr. 30, 2008

(87) PCT Pub. No.: WO2006/059150
PCT Pub. Date: Jun. 8, 2006

(65) Prior Publication Data
US 2009/0012749 A1 Jan. 8, 2009

(30) Foreign Application Priority Data
Nov. 30, 2004 (GB) .................................. 0426250.7

(51) Int. Cl.
*G06F 17/50* (2006.01)
*G01N 33/36* (2006.01)
(52) U.S. Cl. ............... 703/2; 703/5; 156/229; 382/111; 345/419; 706/38
(58) Field of Classification Search .................. 703/2, 6, 703/5; 156/229; 382/111; 345/419; 706/38
See application file for complete search history.

(56) References Cited

U.S. PATENT DOCUMENTS

| | | | | | |
|---|---|---|---|---|---|
| 3,762,977 | A | * | 10/1973 | Langfeldt | 156/229 |
| 5,495,568 | A | * | 2/1996 | Beavin | 700/83 |
| 6,307,953 | B1 | * | 10/2001 | Nevel et al. | 382/111 |
| 6,404,426 | B1 | * | 6/2002 | Weaver | 345/419 |
| 6,641,893 | B1 | * | 11/2003 | Suresh et al. | 428/105 |
| 6,741,726 | B1 | * | 5/2004 | Nevel et al. | 382/111 |
| 2005/0256686 | A1 | * | 11/2005 | Stabelfeldt et al. | 703/6 |

OTHER PUBLICATIONS

*One-Dimensional Model of Cable-In-Conduit Superconductors Under Cyclic Loading Using Artificial Neural Networks*, M. Lefik et al., Fusion Engineering and Design 60, (2002), pp. 105-117.
*A Micromechanical Model for Blended Yarns With Fragmented Low-Elongation Fibers*, T. A. Godfrey et al., JTATM vol. 2, Issue 1, Fall 2001, pp. 1-9.
Boisse et al., "Analyses of Fabric Tensile Behaviour: Determination of the Biaxial Tension-Strain Surfaces and Their Use in Forming Simulations," *Composites Part A: Applied Science and Manufacturing*, vol. 32, No. 10, Oct. 2001, pp. 1395-1414.

(Continued)

*Primary Examiner* — Thai Phan
(74) *Attorney, Agent, or Firm* — Alston & Bird LLP (57) ABSTRACT

A method of modelling fabric properties and behavior first involves generating (16) a yarn model from fiber parameters, which may be empirically determined. The yarn model is homogenised (18, 20) to produce a homogenous representation of the yarn (YMM), suitable for use in finite element analysis. The method may then, secondly, involve generating (24) a fabric weave model by finite element analysis of the yarn representation (YMM). The fabric model is then also homogenised (26, 28) to produce a homogeneous representation of the fabric (FMM), suitable for use in finite element analysis. Finite element analysis of the fabric representation (FMM) can then be used to assess the suitability of various fabric materials for technical applications.

27 Claims, 5 Drawing Sheets

OTHER PUBLICATIONS

Carvelli et al., "A Homogenization Procedure for the Numerical Analysis of Woven Fabric Composites," *Composites Part A; Applied Science and Manufacturing*, vol. 32, No. 10, Oct. 2001, pp. 1425-1432.

Javadi et al., "An Intelligent Finite Element Method for Analysis of Geotechnical Problems," *Computational Fluid and Solid Mechanics 2003, Proceedings of the Second MIT Conference on Computational Fluid and Solid Mechanics*, Jun. 17-20, 2003, pp. 347-350.

Kato et al., "Formulation of Constitutive Equations for Fabric Membranes Based on the Concept of Fabric Lattice Model," *Engineering Structures*, vol. 21, Issue 8, Aug. 1999, pp. 691-708.

Keshavaraj et al., "Airbag Fabric Material Modeling of Nylon and Polyester Fabrics Using a Very Simple Neural Network Architecture," *Journal of Applied Polymer Science*, vol. 60, No. 13, Jun. 27, 1996, pp. 2329-2338.

Kuo et al., "Elastic and Damage Behavior of Three-Dimensional Woven Composites Incorporating Solid Rods," *Composites Part A: Applied Science and Manufacturing*, vol. 30, No. 10, Oct. 1999, pp. 1135-1148.

Lefik et al., "Computational Tools Based on Artificial Neural Networks for Analysis of Composite Materials," *Artificial Intelligence Methods*, 2003, pp. 157.

Lomov et al., "Textile Compsites: Modelling Strategies," *Composites Part A: Applied Science and Manufacturing*, vol. 32, No. 10, Oct. 2001, pp. 1379-1394.

Naik et al., "Analytical Study of Strength and Failure Behaviour of Plain Weave Fabric Composites Made of Twisted Yarns," *Composites Part A: Applied Science and Manufacturing*, vol. 33, No. 5, May 2002, pp. 697-708.

Pidaparti et al., "Material Model for Composites Using Neural Networks," *AIAA Journal*, vol. 31, No. 8, Aug. 1993, pp. 1533-1535.

Swan et al., "Multi-Scale Unit Cell Analyses of Textile Composites," *Proceedings of $15^{th}$ ASCE Engineering Mechanics Conference*, Jun. 2-5, 2002, Columbia University, New York, 8 pages.

Takano et al., "Hierarchical Modelling of Textile Composite Materials and Structures by the Homogenization Method," *Modelling and Simulation in Materials Science and Engineering*, vol. 7, No. 2, Mar. 1, 1999, pp. 207-231.

European Search Report from related European Patent Application No. 05815981.5, Dated Jan. 14, 2008.

* cited by examiner

FABRIC MODELLING

This invention relates to the field of fabric modelling and, in particular, to a method of and apparatus for predicting macroscopic fabric properties from a knowledge of the characteristics of its constituent fibres. Such a model has particular, although by no means exclusive, application to the understanding and prediction of the behaviour of technical textiles.

The field of technical textiles is concerned with the use of fabrics for their mechanical and other physical properties. This is in contrast to the fashion industry in which the selection of a particular fabric is based primarily on aesthetic considerations, with perhaps some concern for warmth or waterproofing. Technical textiles may be composite materials: a fabric weave coated with a resin or plastic, or a layered weave within a polymer matrix. They are used, for example, in the fabrication of vehicle air bags, architectural tensile structures and geotextiles.

In constructing and fitting a vehicle airbag it is important to ensure that it has the correct inflation characteristics. Following impact of the vehicle, the airbag should be deployed rapidly by means of an explosive detonation. The material from which the airbag is fabricated must therefore be capable of rapidly transforming from a folded configuration to an inflated configuration under such explosive stress. Moreover the inflated airbag should rapidly adopt a circular profile, set to the steering wheel or dashboard, with its centre, which is particularly designed to cushion impact, near the most likely head collision site. Any mis-inflation may, for example, result in an elliptical bag, with reduced central area, and therefore compromised safety.

Another category of technical materials are architectural textiles, such as used in the construction of the Millennium Dome. In such architectural applications it is important to avoid wrinkling of the textile material, which will weaken the structure. It is often impossible to determine whether a proposed material will be prone to wrinkling without constructing a prototype of a building, an expensive and time consuming proposition.

Notwithstanding construction of a prototype or mock-up of the finished article, fabrication of the textile material itself is generally a costly and protracted procedure. First a fibre is spun from solution; the fibres must then be processed to form a yarn and finally yarns are woven to create a fabric sample. The whole process of fabric production can take up to six months to complete. The mechanical properties of the fabric sample can only then be tested for their suitability for the proposed application. This is time-consuming enough if the properties do turn out to be suitable, but usually there is some improvement to be had. Selected parameters of the fabrication process may then be altered and the whole procedure repeated. For example, the shape of the fibre cross-section may be changed by using an alternative spinnerette plate. The fibre with the new cross-section is then spun, a yarn created and finally the modified fabric is woven. This may then be another six months down the line. By going through a number of such trial and error iterative steps, a fabric with suitable mechanical properties should ultimately be developed. It would clearly be highly beneficial to the development of novel fabrics to be able to predict the behaviour of a technical material before the textile is fabricated and so to avoid repetition of all the stages involved in fabric manufacture.

Not surprisingly, given this time-intensive fabrication process, there has been some push towards developing mathematical simulations of textile behaviour. Analytical expressions have been used to model the properties of either fabric or yarn, but these tend to yield inaccurate results. Moreover many prior art models require the input of parameters that can only be derived empirically, necessitating prior fabrication of at least the yarn material. Alternatively, a number of assumptions must be made in order to simplify the simulation.

S. Kato, T. Yoshino, H. Minami in Engineering Structures 21 (1999) 691-708, "Formulation of constitutive equations for fabric membranes based on the concept of fabric lattice model" describe a material model of a fabric unit cell weave pattern. The model is based on linkages and springs to represent the fabric unit cell weave pattern, which is fitted to experimental data. Another method of fabric modelling is described in "Multi-scale unit cell analysis of textile composites" C. S. Swan, H-J. Kim $15^{th}$ ASCE Engineering Mechanics Conference Jun. 2-5, 2002, Colombia University, New York, N.Y. Development of a yarn composite material model and a plain weave woven fabric composite material model using homogenisation techniques are described. Again empirical data is required and a transversely isotropic hyperelasticity material model is calibrated to fit this data. To date, the results obtained from these and other prior art models are generally inaccurate and incapable of distinguishing sufficiently between similar fabrics to provide an indication of future utility.

There is a perceived need for an alternative method of modelling textile material properties, which is capable of improved accuracy without the need for input of empirical parameters that can only be obtained after fabrication of a yarn or textile sample.

It is an object of the present invention to provide such a modelling process that overcomes at least some of the aforementioned disadvantages of the prior art.

Accordingly the present invention provides a method of generating a model of a yarn material suitable for use in finite element analysis, the method comprising the steps of:
 (a) Generating a model of a yarn from an assembly of fibres, each fibre being represented as a uniform tubular structure with empirically-determined mechanical properties;
 (b) Simulating deformations (strains) of the yarn model by stretching, compressing, twisting or bending, or a combination thereof, and calculating resulting stresses; and
 (c) Homogenising the yarn model to produce a homogeneous representation of the yarn (YMM) whose mechanical properties approximate to those of the yarn model.

The homogeneous representation of the yarn generated by the method of this invention provides a computationally efficient means with which to model yarn behaviour. The yarn representation predicts the relationship between strain developed on deformation to stress experienced with greater accuracy than found in any prior art representations, and certainly in comparison to those of equivalent computational efficiency. This invention has application to any theoretical calculation that requires knowledge of stress—strain curves as input, but a most preferred application is to the technique of finite element analysis. The yarn representation in accordance with this invention is particularly suited for use as a finite element model in a finite element analysis simulation. This enables yarn behaviour to be predicted, of particular relevance to textile development. By adopting such a predictive approach textile development time can be drastically reduced. Prior art textile development involved lengthy practical steps of first spinning fibres and then processing the fibres into a yarn for mechanical analysis. The present invention obviates the need for processing the fibres into a yarn; the mechanical analysis is performed theoretically on the basis of experimentally obtained fibre mechanical properties.

The fibre model is described herein as being of a uniform tubular structure. This may be of circular cross-section, elliptical, or other cross-sectional geometry, depending on the properties of the fibre being modelled. It is envisaged that in most cases the fibre will be generally of circular cross-section and so the fibre will be given a cylindrical representation.

The step of homogenising the yarn model preferably comprises the steps of:
(a) Training a neural network using the strains applied and stresses calculated in step (b) above; and
(b) Using the neural network as at least a portion of the homogeneous representation of the yarn material.

Use of a neural network to provide the YMM, or a component of the YMM (other equations may also be included in the model), is a particularly advantageous embodiment of this invention. Prior art representations of a YMM, for example that of S. Kato et al., referenced above, suffer from a number of disadvantages in comparison. If the form of the equations is selected by the analyst then an inherent bias and/or assumption is introduced. Another analyst may choose different equations and so introduce a different bias, despite working with the same data set. The neural network on the other hand determines its own best fit to the available data, thus removing operator bias. Some time must inevitably have been spent in selecting the equations published by Kato et al. That is, there was still some degree of trial and error experimentation (albeit in theoretical calculations), that inevitably increases the time taken to generate the best constitutive model. Moreover the neural network is capable of modelling far more complex data sets than that used to validate the equations of Kato et al.

In a second aspect the present invention provides a method of generating a model of a fabric material suitable for use in finite element analysis, the method comprising the steps of:
(a) Generating a model of a yarn from an assembly of fibres, each fibre being represented as a uniform tubular structure with empirically-determined mechanical properties;
(b) Simulating deformations (strains) of the yarn model by stretching, compressing, twisting or bending, or a combination thereof, and calculating resulting stresses;
(c) Homogenising the yarn model to produce a homogeneous representation of the yarn (YMM) whose mechanical properties approximate to those simulated in the yarn model;
(d) Generating a model of a fabric weave unit cell from the YMM;
(e) Simulating deformations (strains) of the fabric model by stretching, compressing, twisting or bending, or a combination thereof, and calculating resulting stresses; and
(f) Homogenising the fabric model to produce a homogeneous representation of the fabric (FMM) whose mechanical properties approximate to those simulated in the fabric model.

In alternative aspects the present invention provides a method of assessing the suitability of fabric materials for technical applications, a computer arranged to provide such assessment and a computer program for generating models of yarns and fabrics for use in finite element analysis simulations.

Embodiments of the invention will now be described by way of example only and with reference to the accompanying drawings.

Figure 1:
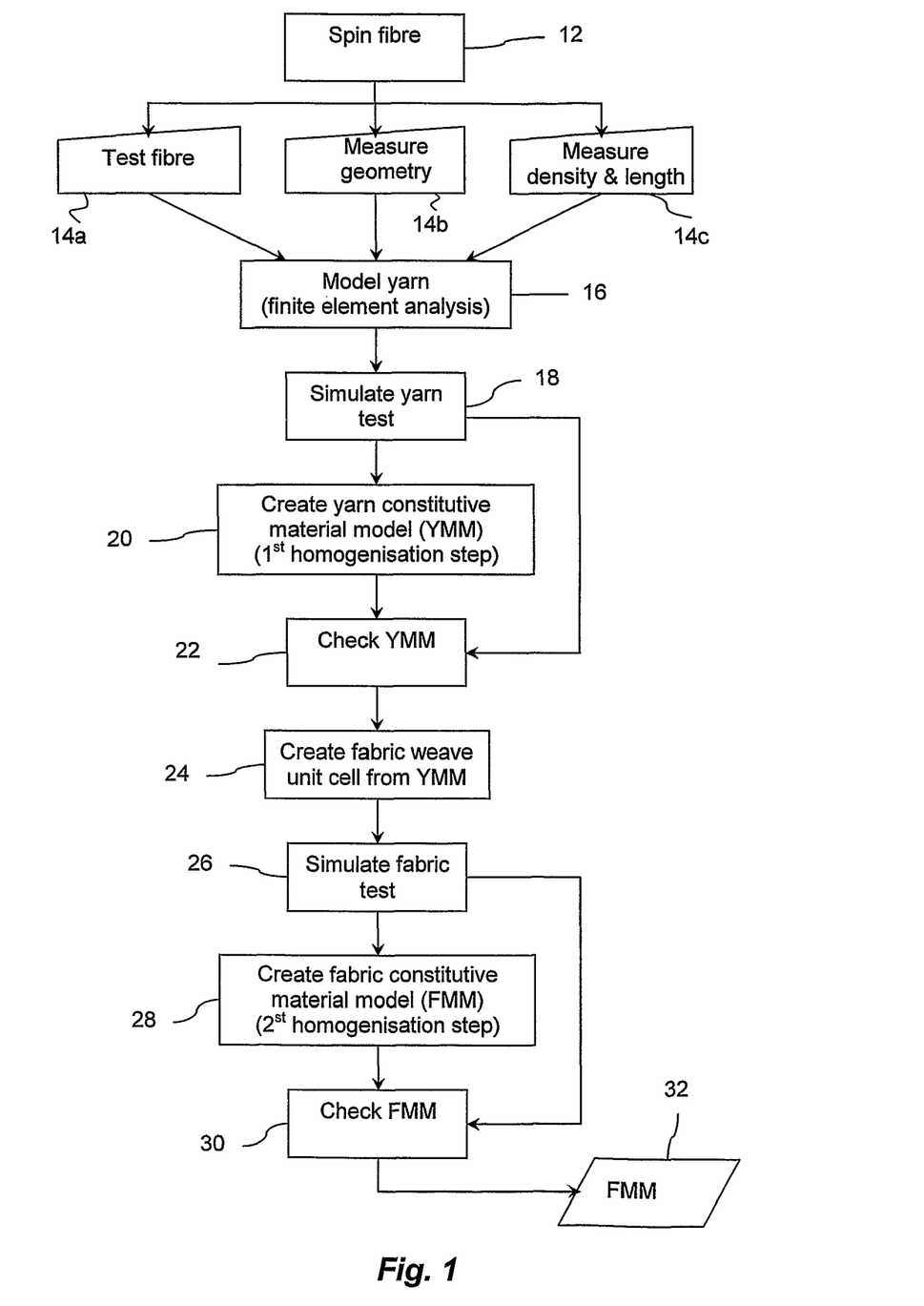
FIG. 1 is a flow chart illustrating the steps involved in creating a model of a textile material in accordance with this invention.

With reference to FIG. 1 there is shown a flow chart 10 that illustrates the steps involved in creating a model of a textile material in accordance with this invention. Before embarking on this simulation it is anticipated that materials likely to possess properties that are suitable for the proposed application have been identified. That is, the desired fibre constituent can be synthesised. As in the prior art methods described above, some degree of empirical data is required to be input to the method of this invention and this is to be obtained from the fibre. This is in contrast to prior art modelling tools in which empirical data from at least the yarn constituent of the textile material is required. A first step 12 of a modelling process in accordance with this invention therefore is to spin the fibres. This spinning process 12 is standard in the art of textile design and manufacture and will not be described in detail herein. Suffice to say there are a number of process parameters, such as design of spinnerette referred to above, that can affect fibre properties to a greater or lesser degree.

A next step 14 is to obtain empirical data for input to the model. These data are obtained in a test step 14a in which mechanical properties of the spun fibre are extracted by mechanical testing and in two measurement steps 14b, 14c.

The mechanical test 14a involves measuring the fibre—fibre friction characteristics using the known pull-out test and deriving the stress-strain curve by mechanical tensile tests. The stress-strain curve may be obtained from a single fibre or from a collection of fibres. The collection of fibres is preferred as this, first, is easier to manipulate and, secondly, responds with a larger signal for measurement, thereby improving the signal to noise ratio. An example of a measurement that can be carried out is the so-called "droop" test. A fibre (or collection of fibres) is held horizontally at one end and the degree through which the opposing end falls is measured. From this measurement, the elastic modulus can readily be derived and used to check the full elastic modulus as determined by the tensile test.

At step 14b the geometry of a single fibre is measured using a microscope. This can be either an optical microscope or a scanning electron microscope. All that is required is that it is powerful enough to image both the fibre and a scale for measurement. At this step 14b parameters such as fibre diameter and fibre cross-section area and geometry (and whether this varies over the fibre length) are measured.

The final empirical parameters to be used in this analysis are density of the fibre material and the average fibre length. These are measured at step 14c. Fibre density may be measured by means of a gradated column. The column is filled with a liquid that has a density gradient along its length. For example, salt water with high salt concentration at the bottom and low concentration at the top. The fibre is floated in the column and allowed to reach its equilibrium level. The density of the fibre is therefore equal to that of the liquid at this point. Average fibre length is measured by combing out a small sample of fibres and determining the average length within this sample.

At step 16 a mathematical model of a length of yarn material is built up from the measured properties of the individual fibre using finite element analysis. Finite element analysis (FEA) is a mathematical tool by which simple approximate mathematical models of the behaviour of small areas or volumes (or elements) of structures can be assembled to form a model of the complete structure. The elements may be, for example, a 3-D solid element for modelling thick structures; a 2-D solid element for modelling problems in plane stress, plane strain and axisymmetry; plate and shell elements for modelling thin-wall structures; in addition to numerous elements for dynamic processes such as thermal analysis, electromagnetic simulation and some fluids applications. The basic finite element mathematical model relates applied forces to resulting displacements through the equilibrium equation:

$$F_e = K_e u_e$$

where $F_e$ and $u_e$ represent force and deformation respectively at specific locations in the element called nodes and $K_e$ is an element stiffness matrix. Mathematical models of complex structures are built up by assembling a number of simple finite elements, joined at shared or common nodes, to form the complex shape. Nodal displacements u throughout the structure are then linked to the vector F of all forces that can be applied to the nodes through a global stiffness matrix K: F=Ku. There may typically be of the order of 10,000 degrees of freedom in the above matrix equation. This can be solved by computer and numerous commercial off-the-shelf (COTS) FEA software packages are available for this purpose: ABAQUS, LS-DYNA, ANSYS, ADINA, MARC Nastran, etc.

The above-listed software programs may vary somewhat in their details, but all follow the three standard steps of a FEA procedure:

| pre-processing: | defining the element model |
|---|---|
| solution: | solving for displacement, stress, strain, etc. |
| post-processing: | reviewing results in text and graphical form. |

Figure 2:
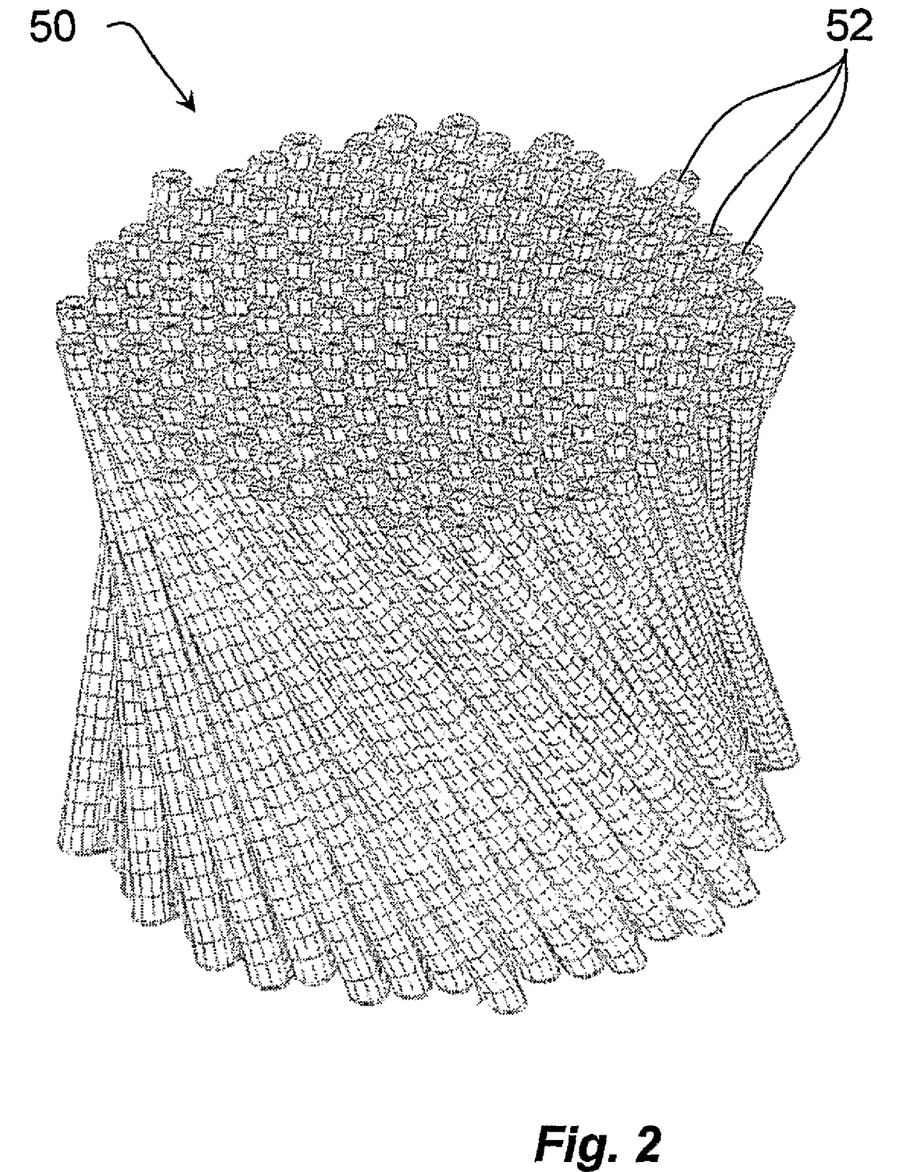
FIG. 2 illustrates a representation of a yarn material comprising approximately two hundred fibre elements.

At this step 16 of the invention each fibre is represented as a solid cylinder structure. That is, a cylindrical geometry is used and filled with a relatively small number of 3D brick finite elements. The mechanical properties of each fibre cylinder element, which term shall be taken to refer to the cylindrical geometry filled with 3D brick elements, is selected to reproduce the actual measured parameters. The fibre model cylinders are then twisted together to form a short length of yarn. FIG. 2 illustrates a representation 50 of a yarn material comprising approximately two hundred fibre elements 52. In modelling the yarn length, the number of fibres input corresponds to the number expected to form the real yarn. The twist imparted to the yarn is also the same as the twist of the real yarn. If the average fibre length is important, which it will be if the simulated yarn length is greater than the average fibre length, then a number of free fibre ends will be incorporated in the FEA model of the bundle of fibres.

Once the model of fibre cylinder elements twisted together to form a short yarn length is built up, the process moves on to simulate testing of this model yarn at step 18. At this stage computations are performed to predict the full mechanical response of the yarn model. That is, the assembly of cylindrical elements, each representing a fibre, are mathematically stretched, compressed, bent and twisted to determine their collective mechanical response. These simulations are carried out within the FEA software package using standard techniques that will be clear to those skilled in the art of FEA software implementation.

The length of the yarn model is long enough to render fibre end effects negligible. This is achieved by running a number of simulations of yarns of varying lengths and extrapolating the results to an infinite yarn sample.

At the next step 20 the method requires creation of a yarn constitutive material model (YMM). The yarn itself is now modelled as a cylindrical element of the same external diameter as the bundle of fibres that was modelled at step 16 to generate the yarn. That is, we revert to the first stage of a FEA procedure, but this time with a yarn finite element as opposed to a fibre finite element. This process exploits a relatively advanced finite element technique known as homogenisation. The term "homogenisation" refers to the fact that the bundle of discrete fibres is now to be treated as a uniform geometric element. In what follows the uniform element will be described as a cylinder, which illustration is used for the purposes of clarity only. The uniform element may also be, for example, of elliptical cross section, if that better represents the shape of the yarn material that is being simulated. It is the uniform composition of this element, whatever its shape, that is important to this invention. In order to derive accurate predictions from this substitution it is important to develop an accurate YMM. Carrying out an homogenisation process using simulated data is a particularly novel aspect of this invention. FE homogenisation is known in the prior art, but has previously only been applied to lower-quality empirical data. It has never been employed in modelling a yarn material.

As stated above the pre-processing stage of any FEA procedure is to define the finite element model. This involves the analyst setting the geometry and material properties of the structure and identifying the type of finite element to use. A computer running a FEA software package will store these definitions as a set of constitutive equations and from there will simulate deformations of the model in the FEA processing stage. In the method of the present invention the constitutive equations for the yarn may be generated by homogenisation in accordance with the mathematical procedure described by S. Kato et al. in Engineering Structures 21 (1999) pp 691-708. It is preferred however that the constitutive equations are not generated by this route but are replaced by a neural network representing the yarn constitutive material model.

A neural network is a particular type of software that can be used to create complex mathematical relationships between data sets. For example, if a number of experiments have been carried out in order to measure the strength of a fabric as factors such as the fibre diameter, friction between fibres and the number of fibres in a yarn are varied, then the neural network can be "trained" to learn the relationships between the three inputs (fibre diameter, friction and number of fibres in a yarn) and the output (fabric strength). The training or learning phase involves presenting the inputs to the neural network and iteratively adjusting the network variables whilst studying the output. When the output predictions match the experimentally measured fabric strength then the network parameters are fixed.

Use of a neural network to represent mathematically a constitutive material model has been described in the prior art. See, for example, "An intelligent finite element method for analysis of geotechnical problems" A. A. Javadi, T. P. Tan, M. Zhang Computational Fluid and Solid Mechanics (2003) 347 and "Computational tools based on artificial neural networks for analysis of composite materials" M. Lefik, M.

Wojciechowski Artificial Intelligence Methods (2003) 157. This latter publication describes fitting a large structure made up of the neural network material model to simulation data from a composite structure.

In the preferred embodiment of this invention, the cylindrical YMM is a neural network that is trained using the data generated in the simulated yarn test step 18.

In creating the YMM at step 20, the data obtained in the simulated yarn test 18 are used to train the neural network. It will be recalled that these data are the mechanical characteristics of stress and strain as applied to the multi-fibre yarn model. In other embodiments of the invention physical properties such as temperature, electrical properties (resistance, capacitance, inductance, piezoelectric effects), porosity, chemical activity and magnetism may additionally or alternatively be included in the material model. These are not directly relevant to the problem of technical textile analysis however. FORTRAN code for the neural network training program that is used in this embodiment of the invention is set out in Appendix 1. A file t33nn.txt contains the data obtained at step 18 that is used for training. The network is set with six inputs, six outputs and five hidden layer neurons. When executed, the program of Appendix 1 reads in the data from the training file and adjusts the network weights until the input and output arrangements are matched. The weights are output to a file t33nn.wts.

For this piece of code and level of network, 297 data points are sufficient for training. This data, as will be seen in relation to FIGS. 4 and 5, relates to only one deformation mode (stretch—compression along one axis) and is included by way of example only. In a real analysis situation many more deformation modes will need to be captured, requiring many more data training points. For example another deformation mode such as twisting should be included and combined with all other sensible permutations of deformation: stretch, twist, shear, stretch+twist, stretch+twist+shear, etc. It can therefore be seen that the required data set gets very complicated and very large, very quickly. The simplified example presented here is therefore included for clarity of illustration only.

Use of simulated data to train the neural network is particularly advantageous in that experimental techniques simply cannot generate anything like the same amount of information in a reasonable timescale.

Once the neural network weights have been determined, the network can then be used to create the YMM. FORTRAN code for carrying out this task is set out in Appendix 2. The YMM represents the mathematical relationship that, in this embodiment, links the strain resulting from a deformation (stretching or compression, twisting or shearing) of the cylindrical element to the predicted stresses that it experiences. In the code listed in Appendix 2 the neural network predictions are called as a subroutine cs(p1,o). p1 is an array containing the strain data, the input to the neural network and o is an array containing the predicted stress data. Both p1 and o contain 6 numbers representing the following stress or strain components: xx, yy, zz, xy, xz and yz. DATA statements contain the weights of the neural network (obtained by the training program) for 6 input neurons, 5 hidden neurons and 6 output neurons.

At step 22 the YMM is validated by computer simulation. That is, the uniform element consisting of a cylinder of the same external diameter as the yarn is stretched, compressed, twisted and bent and predicted stresses obtained. The strains used in the checking stage must clearly be different from those used to train the neural network. The same deformations are then applied to the yarn model (of step 16) comprising the assembly of fibre finite elements. Results are cross-checked to verify the accuracy of the YMM.

Figure 3:
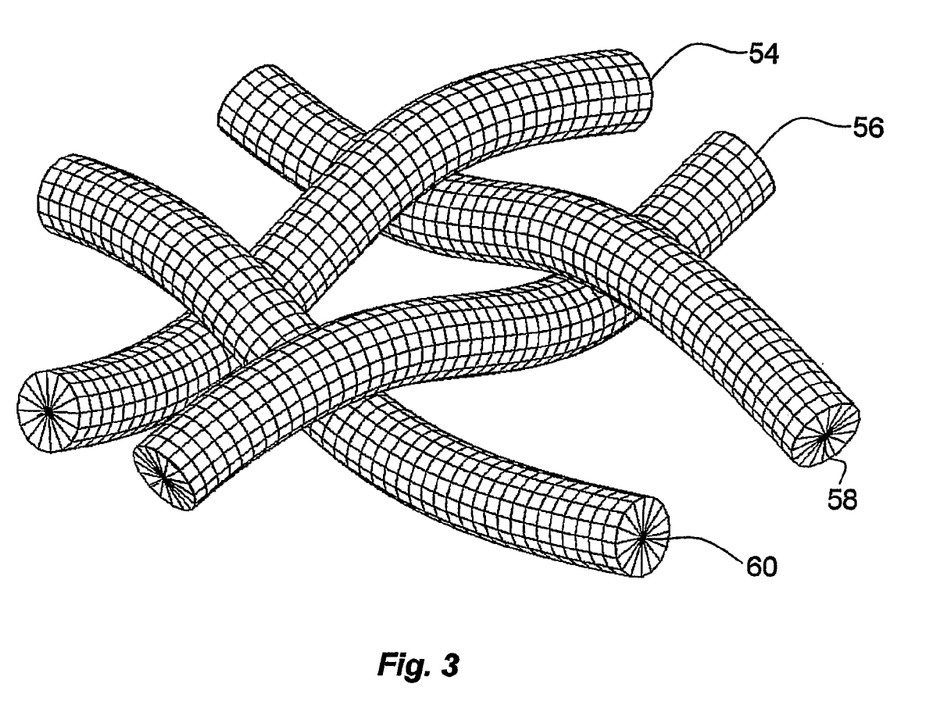
FIG. 3 illustrates a representative example of a weave unit cell.

The YMM can thereafter be extended axially to model a yarn of any desired length. It can be bent, sheared, etc., as the real yarn material. At a next step 24, a fabric weave unit cell is simulated using the necessary number of yarns represented by YMMs. An example of a weave unit cell is shown in FIG. 3. The yarn is represented as solid cylindrical elements 54, 56, 58, 60, as generated by the YMM. In this example a standard weave pattern, known as a 1-1 weave, is illustrated. The weave consists of two warp threads 54, 56 and two weft threads 58, 60. One weft thread 58 passes under a first 54 warp thread and over a second 56. A second weft thread passes over the first 54 warp and under the second 56. Alternate threads along the warp or weft direction are therefore identical and the fabric unit cell contains four distinct yarns. In a 2-1 weave (not shown) a first weft passes over two warp threads and under a third, and the fabric unit cell is correspondingly larger. As well as the weave pattern, unit cell dimensions depend on yarn cross-sectional area and mechanical properties such as pliability. Once a unit cell has been modelled, boundary conditions and translations can be applied to generate a model of the expanse of fabric.

If the fabric to be modelled is a textile composite then the unit cell is encased in a matrix material, for example, a polymer.

Simulation tests of the fabric unit cell are then performed by computer at step 26. This step is analogous to the simulated yarn testing carried out at step 18. That is, the fabric weave model, comprising the full unit cell, is twisted, sheared, stretched and compressed in order to obtain its mechanical response. Ideally, all possible combinations of these deformation modes are simulated.

As with the yarn model, the data obtained from the simulated fabric test at step 26 is used to train a neural network to form a constitutive material model of the fabric (FMM). This process incorporates a second homogenisation step and the fabric unit cell is modelled as a uniform element. A single shell element of a FEA is preferred, although 3D and 2D elements of all types may alternatively be used. Generally however the fabric is expected to be flat and of relatively large area, and so a shell element will be used for computational efficiency. Alternatively, the homogenisation step can be performed with a set of mathematical equations as described by S. Kato et al., referenced above.

Figure 4:
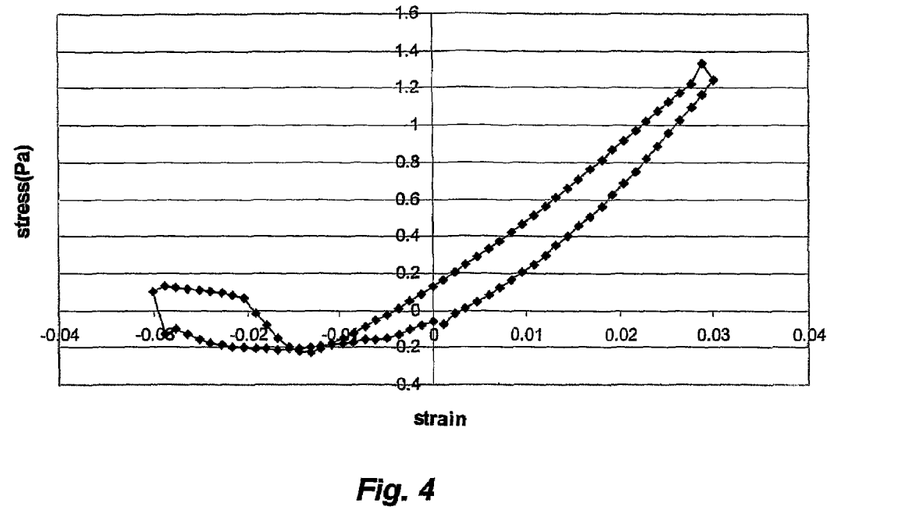
FIG. 4 is a plot of stress-strain data obtained during the simulated fabric test of an embodiment of this invention.
Figure 5:
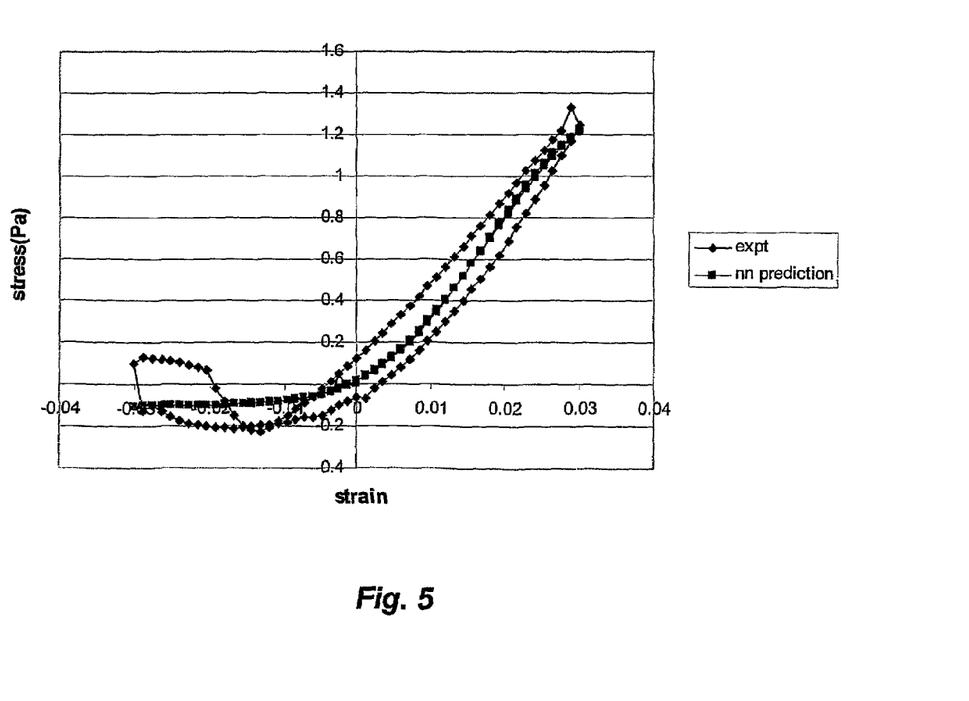
FIG. 5 is a plot of stress-strain data obtained by prediction of a neural network in accordance with an embodiment of this invention, the plot being overlaid on that shown in FIG. 4.

The process steps used to create the FMM will now be described with reference to FIGS. 4 and 5. FIG. 4 is a plot of stress-strain data obtained during the simulated fabric test of step 26. The fabric weave unit cell that was modelled in step 24 is incrementally stretched up to 3% in the warp direction, decrementally compressed up to 3% in the same direction and then relaxed to equilibrium. The stresses experienced by the model as a result of this strain were calculated. The results are shown plotted as squares in the graph 62 of FIG. 4.

In this example only one direction of stretching and compression is described. In the full fabric weave model, other stretches, twists and bend directions, in addition to combinations thereof, are applied to the fabric weave unit cell and resulting stresses modelled. In this way, a full range of mechanical deformations that the fabric may undergo are simulated. The resulting stresses on the fabric are used to train the neural network. In a practical application of this invention there may be in excess of 1000 data points used to train the network.

In this reduced example however, in which only one strain direction is illustrated for clarity, the data shown in the plot of FIG. 4 are used to train the neural network in accordance with the program listed in Appendix 1. The trained neural network (the FMM) is then used in place of the constitutive equations that would normally be used to describe a material model in a FEA software package. This neural network is listed in Appendix 2. The same neural network and training program may, in general, be used for both the fabric and yarn constitutive models. Some modifications to the network described in the appendices would be needed in the event that the data (either yarn or fabric) set is particularly complex. Such modifications will be apparent to any skilled neural network designer and will not be described further herein.

At step 30 the FMM is verified. A patch of fabric the same size as the unit cell is created from the FMM for a FE simulation. The modelled patch is deformed in the same way as the fabric unit cell simulation in step 26. That is, the same combinations (all possible) of the deformation modes are applied, but with different relative strengths. The results of stretches and compression of ±3% in the warp direction applied to the neural network are shown in FIG. 5. Each FMM prediction is plotted as a diamond on a graph 64. The neural network predictions 64 are shown superposed on the simulated measurements 62. It can be seen that the predictions closely match the simulated results. The neural network structure and/or size of data set can be adapted to ensure that the level of correspondence achieved matches that required for the particular application.

This confirms that the method of this invention provides sufficiently accurate models that can be used in FEA to predict the behaviour of textile materials.

As a final step 32, the FMM is output, ready for use in finite element analysis simulations such as car airbags. Such FEA simulations are well known and will not be described further herein. It will be appreciated by one skilled in finite element analysis that defining the finite element model is the most labour intensive part of the simulation. This invention provides a novel method of generating a finite element model for use in textile simulations. The finite element model obtained by this procedure is more accurate than those employed in the prior art, whilst at the same time providing a computationally efficient basis for FE calculations. All this is achieved without the need to extract empirical data for the model from yarn material.

In order to assess suitability of a fabric for a particular application the fabric is first modelled in accordance with the procedure described in relation to FIG. 1. This results in creation of a fabric constitutive material model that may then be used in prior art FEA simulations. For example, if the fabric is for use in car airbags, the FMM can be used in simulations involving airbags. A FMM can be created for all envisaged variants: weave pattern, number of fabric layers, different fabrics, yarn thickness, etc. Each FMM can be input to the airbag simulation and the performance of the airbag optimised by computer-generation of new fabrics.

There are many advantages to being able to carry out an assessment of material suitability using only empirical data obtained from component fibres, but the primary advantage is one of time reduction. The only experimental development necessary for this invention is the fibre spinning stage. All other predications and variations can be modelled on a computer. Without the need for practical experimentation the cost of novel fabric development is also very much reduced.

Of course it is not strictly necessary to have even empirical data from fibres in order to implement this invention. The pre-determined mechanical properties required for the simulations and analysis can be estimated, provided the results remain meaningful. This can be particularly important if potential variations to the fibre properties are being investigated by this tool. It is envisaged in such cases that educated assumptions may be made about, for example, spinning a stronger, or more pliable, fibre.

The model developed as described herein has been found to be particularly useful in a number of FE fabric simulations. In the prior art, modelling of woven and/or knitted fabrics has been notoriously difficult. Any model has to account for the diverse properties that the fabric will shear easily if a particular deformation (trellisation) is applied and yet is very resistant to opposing forces applied along the length of a yarn. This invention provides a method of textile modelling in which these difficulties are, to some extent, overcome. Moreover contact between two surfaces, for example the warp and weft threads, has also proved difficult to model accurately because of the sudden discontinuity, but this may be achieved by the methods described herein.

This invention is not limited to application in the field of textile weaves. The YMM can be used in simulations of ropes made up of a collection of yarns. It can also be used to simulate a unit cell of a knitted fabric, netting, carbon fibre weaves, carbon fibre composites and textile composites. That is, this invention can be adapted for use in modelling anything that can be broken down into fibres, cylinders or yarns.

Figure 6:
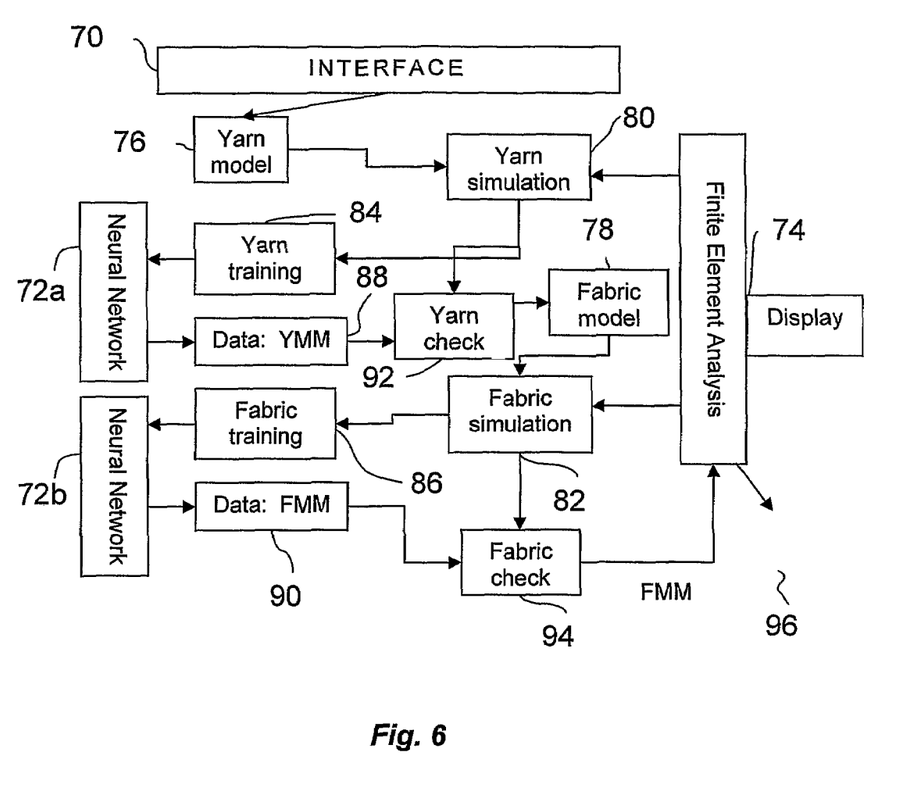
FIG. 6 is a schematic illustration of a computer system arranged to implement another aspect of this invention.

A second aspect of this invention is illustrated in FIG. 6. This Figure shows a schematic illustration of components of a computer set up to model textile behaviour in accordance with this invention. The computer comprises an input interface 70 (generally, keyboard, screen and mouse, not individually shown), first 72a and second 72b neural network program modules and finite element analysis (FEA) program module 74. A user is able to input fibre data and to control operation of the neural networks 72a,b and FEA 74 program modules via the interface 70. In addition the computer comprises modules for generating and storing yarn 76 and fabric 78 models; modules for simulating yarn 80 and fabric 82 deformations and stresses; modules for running yarn 84 and fabric 86 training routines on the neural network 72; two data memory units 88, 90 for holding yarn and fabric constitutive material models respectively; modules for yarn 92 and fabric 94 verification and a display screen 96 for display of inputs to and the results of FEA calculations.

In carrying out the fabric modelling process the computer is operated to follow the steps of FIG. 1. The user inputs details of the fibre characteristics that have been obtained experimentally (or estimated, with some basis) and of operating parameters such as number of fibres in the yarn, degree of yarn twist, desired fabric weave pattern and any composite information. At this stage, or at a subsequent stage of the procedure, the user may also define the neural network complexity, such as number of hidden layers and any optional parameters permitted by the FEA software implementation. The yarn modelling module 76, on the basis of input fibre properties, generates first the cylindrical finite element to represent each fibre, and then forms a bundle of such fibre representations of the required twist and yarn length. Details of this yarn model are output to the yarn simulation module 80, which calls the appropriate FEA subroutines from the FEA module 74 in order to simulate a full range of yarn deformations. Stress—strain curves generated in this simulation are output to the yarn training module 84, to the yarn verification module 92 and, optionally, to the display 96. If displayed, the user can check that an appropriate range of stresses and strains have been simulated, and that no anomalous results have been generated. The user may remove any anomalous results or run further simulations, as required. The yarn training module 84 is arranged to train the neural network 72a using the stress—strain results from the yarn simulation such that it mathematically represents a yarn constitutive material model (YMM). The trained neural network (YMM) is stored in the yarn memory unit 88 for access by further processing modules. Data representing the YMM is then verified by the yarn verification module 92, which compares neural network 72a predictions with corresponding results output from the yarn simulation module 80. If the neural network predictions match the simulation results to the desired degree of accuracy then the YMM is passed to the fabric modelling module 78 for building into a model of fabric material. If further accuracy is required then the network parameters may be adjusted by the user and the yarn training process repeated.

An analogous procedure is then followed to build the YMM into a fabric model suitable for FEA. The fabric modelling module 78, on the basis of the verified YMM as stored in memory 88 and weave and composite matrix (if any) information input by the user, generates a model of a fabric unit cell. Details of this fabric model are output to the fabric simulation module 82, which calls the appropriate FEA subroutines from the FEA module 74 in order to simulate a full range of fabric cell deformations. Stress—strain curves generated in this simulation are output to the fabric training module 86, to the fabric verification module 94 and, optionally, to the display 96. Again, the user can check the display 96 to ensure that an appropriate range of stresses and strains have been simulated and that there are no anomalous results. The fabric training module 86 is arranged to train the second neural network 72b using the stress—strain results from the fabric simulation such that it mathematically represents a fabric constitutive material model (FMM). The trained neural network (FMM) is stored in the fabric memory unit 90 for access by further processing modules. Data representing the FMM is then verified by the fabric verification module 94, which compares neural network 72b predictions with corresponding results output from the fabric simulation module 82. If the neural network predictions match the simulation results to the desired degree of accuracy then the FMM is passed to the FEA 74 module in order to simulate its performance in a technical textile environment. Again, if the accuracy needs improving then the network parameters may be adjusted by the user and the fabric training process repeated. The output of the FEA simulations, for example the performance of a vehicle airbag fabricated from the modelled material, may then be displayed graphically to the user.

In running a number of such fabric simulations, the user may adjust fibre, yarn, weave and composite properties in each simulation. A comparison of results will demonstrate those parameters that should be best suited for incorporation in a material for the simulated application. The textile may then be fabricated with these modelled parameters and article constructed. This avoids the need for continuous trial and error fabrication, as required by the prior art.

It will be appreciated that this invention relates to a set of software tools that can be used to model yarns and fabrics. Once established, there are many ways of using these tools, depending on what an operator wishes to achieve. For example, if you have a sample of a fabric, its dimensions can be obtained by optical microscopy and modelled using the software described herein. Similarly fibres and yarns can also be modelled if their actual dimensions are known.

APPENDIX 1

The neural network training program

```
program network_t
real,allocatable ::
d(:,:),ti(:,:),to(:,:),w1(:,:),w2(:,:),h(:),w3(:,:),w4(:,:),i1(:),d1(:,:),d2(:,:),
o1(:),o2(:),e(:),d3(:,:),d4(:,:),d5(:,:),wt1(:,:),wt2(:,:),d43(:,:),d21(:,:)
open(1,file='t33nn.txt')
read(1,*)n,i10,n10,n11,n12
n11=n11+1
n14=i10+n10
i20=i10+1
n30=i20+1
n50=i20+n11
allocate(ti(n,i20),to(n,n10),h(n30:n50),i1(i20),d(n,n14),d1(1,n30:n50),
d2(i20,1),d3(1,n10),d4(n30:n50,1),d5(1,n30:n50))
allocate(w1(i20,n30:n50),w3(i20,n30:n50),w2(n30:n50,n10),
w4(n30:n50,n10),o1(n10),o2(n10),e(n10),wt1(n30:n50,i20))
allocate(wt2(n10,n30:n50),d43(n30:n50,n10),d21(i20,n30:n50))
do i=1,n
read(1,*)(d(i,k),k=1,n14)
enddo
close(1)
do i44=1,n
do j44=1,i10
ti(i44,j44)=d(i44,j44)
enddo
enddo
do i44=1,n
ti(i44,i20)=1
enddo
do i44=1,n
do j44=1,n10
k44=i20+j44-1
to(i44,j44)=d(i44,k44)
enddo
enddo
deallocate(d)
do k=n30,n50
do j=1,n10
call random(r3)
w2(k,j)=(r3-0.5)/5
enddo
do j=1,i20
call random(r3)
w1(j,k)=(r3-0.5)/5
enddo
enddo
w3=w1
w4=w2
r2=1
print *,'itns    err'
m1=1
do m=1,n12
do i=1,n
call random(r3)
i64=nint(r3*(n-1))+1
do i44=1,i20
i1(i44)=ti(i64,i44)
enddo
do i44=1,n10
o1(i44)=to(i64,i44)
enddo
do i44=1,i20
do j44=n30,n50
wt1(j44,i44)=w1(i44,j44)
enddo
enddo
do i44=n30,n50
h(i44)=0.0
do j44=1,i20
h(i44)=h(i44)+wt1(i44,j44)*i1(j44)
enddo
enddo
do i44=n30,n50
h(i44)=tanh(h(i44))
enddo
h(n50)=1
do i44=n30,n50
do j44=1,n10
wt2(j44,i44)=w2(i44,j44)
```

APPENDIX 1-continued

The neural network training program

```
enddo
enddo
do i44=1,n10
o2(i44)=0.0
do j44=n30,n50
o2(i44)=o2(i44)+wt2(i44,j44)*h(j44)
enddo
enddo
do i44=1,n10
e(i44)=o2(i44)-o1(i44)
enddo
do i44=1,n10
d3(1,i44)=e(i44)
enddo
do i44=n30,n50
d4(i44,1)=h(i44)*.01
enddo
do i44=n30,n50
do j44=1,n10
d43(i44,j44)=d4(i44,1)*d3(1,j44)
enddo
enddo
do i44=n30,n50
do j44=1,n10
w2(i44,j44)=w2(i44,j44)-d43(i44,j44)
enddo
enddo
do i44=1,i20
d2(i44,1)=ti(i64,i44)
enddo
do i44=1,n10
d3(1,i44)=e(i44)
enddo
do i44=n30,n50
do j44=1,n10
wt2(j44,i44)=w2(i44,j44)
enddo
enddo
do i44=n30,n50
d1(1,i44)=0.0
do j44=1,n10
d1(1,i44)=d1(1,i44)+d3(1,j44)*wt2(j44,i44)
enddo
enddo
do i44=n30,n50
d5(1,i44)=1-h(i44)**2
enddo
do i44=n30,n50
d1(1,i44)=d1(1,i44)*d5(1,i44)
enddo
do i44=1,i20
do j44=n30,n50
d21(i44,j44)=d2(i44,1)*d1(1,j44)*.1
enddo
enddo
do i44=1,i20
do j44=n30,n50
w1(i44,j44)=w1(i44,j44)-d21(i44,j44)
enddo
enddo
se=0
do j=1,n
do i44=1,i20
i1(i44)=ti(j,i44)
enddo
do i44=1,n10
o1(i44)=to(j,i44)
enddo
do i44=1,i20
do j44=n30,n50
wt1(j44,i44)=w1(i44,j44)
enddo
enddo
do i44=n30,n50
h(i44)=0.0
do j44=1,i20
h(i44)=h(i44)+wt1(i44,j44)*i1(j44)
```

APPENDIX 1-continued

The neural network training program

```
enddo
enddo
do i44=n30,n50
h(i44)=tanh(h(i44))
enddo
h(n50)=1
do i44=n30,n50
do j44=1,n10
wt2(j44,i44)=w2(i44,j44)
enddo
enddo
do i44=1,n10
o2(i44)=0.0
do j44=n30,n50
o2(i44)=o2(i44)+wt2(i44,j44)*h(j44)
enddo
enddo
do i44=1,n10
e(i44)=o2(i44)-o1(i44)
enddo
do i44=1,n10
se=se+e(i44)**2
enddo
enddo
r1=sqrt(se/n)
if (r1<r2) then
  w3=w1
  w4=w2
  r2=r1
else
  w1=w3
  w2=w4
endif
m1=m1+1
if (m.eq.1) then
  print *,m,r2
else
  if (m1.gt.n12/10) then
    m1=1
    print *,m,r2
  endif
endif
enddo
open(1,file='t33nn.wts')
write(1,*)i20,n11,n10
write(1,*)w1
write(1,*)w2
close(1)
end program network_t
```

APPENDIX 2

Neural network code

```
SUBROUTINE CS(p1,o)
C o=STRESS p1=STRAIN
   IMPLICIT DOUBLE PRECISION (A-H,O-Z)
   DIMENSION W1(7,8:13),w2(8:13,6),W3(6,8:13),h(8:13),p1(6),pw(7)
   DIMENSION o(6),pmi(6),pma(6),omi(6),oma(6),w4(8:13,7)
   data pma/0.030066372,0.029807237,0.028693188,1,0.03006012,1/data
   pmi/-0.030066372,-0.018962474,-0.030060437,-1,-0.03006012,-1/
   data oma/1.333242124,1,1.314354205,1,0.001462673,1/
   data omi/-0.223899046,-1,-0.315504062,-1,-0.026936141,-1/
   DATA w1/-2.688470,1.855105,1.502287,0.1857575,0.6330138,
  A0.1491318,0.2905539,0.1939551,0.6918184,0.3253568,
  B0.4438594,1.112069,0.4442667,0.8202290,-0.6850701,
  C0.8188785,-0.2926500,-8.5256584E-02,3.967464,-0.1343600,
  D-0.2679479,-1.054236,2.148004,-0.6894867,-3.7078861E-02,
  E-0.3904300,-6.5008841E-02,-2.7333617E-02,-0.9425272,-2.107733,
  F2.638241,-0.2035732,-0.8019451,-0.1693883,-0.2815605,
  G-6.5170405E-03,1.5803169E-02,3.4822535E-02,-8.1317700E-02,
  H-8.6659350E-02,6.6540524E-02,-2.2043502E-02/
   DATA w2/-0.4460463,0.3226118,9.4280772E-02,4.8217896E-02,
  A5.6724604E-02,
  A0.2111905,-3.4546069E-04,0.2361144,-6.3529769E-03,
```

APPENDIX 2-continued

Neural network code

```
  -6.8163540E-04,
B1.9831996E-04,0.2736425,-2.4948923E-02,0.2417556,0.1244594,
C3.4961998E-02,0.4145263,0.2373217,-7.9473451E-04,0.2560921,
D-7.1797064E-03,-2.9026193E-04,6.1768858E-04,0.2553633,
  -0.3559598,
E0.3930570,0.7491458,0.2889002,0.3192620,0.2049721,
F-6.0661475E-04,0.2285851,-6.3376711E-03,-3.6896594E-04,
F4.5285077E-04,
G0.2814262/
C normalise inputs
  DO I=1,6
  pw(i)=.8/(pma(i)-pmi(i))*(p1(i)-pmi(i))+.1
  ENDDO
c bias
  pw(7)=1
c nn
c transpose
  do i=1,7
  do j=8,13
  w4(j,i)=w1(i,j)
  enddo
  enddo
c multiply
  do i=1,6
  h(i+7)=0.0
  do j=1,7
  h(i+7)=h(i+7)+w4(i+7,j)*pw(j)
  enddo
  enddo
  do i=1,6
  h(i+7)=tanh(h(i+7))
  enddo
  h(13)=1
c transpose
  do i=1,6
  do j=1,6
  w3(i,j+7)=w2(j+7,i)
  enddo
  enddo
c multiply
  do i=1,6
  o(i)=0.0
  do j=1,6
  o(i)=o(i)+w3(i,j+7)*h(j+7)
  enddo
  enddo
  do i=1,6
  o(i)=(oma(i)-omi(i))/.8*(o(i)-.1)+omi(i)
  enddo
  RETURN
  END
```

The invention claimed is:

1. A method of generating a model of a yarn material suitable for use in finite element analysis, the method comprising:
generating a yarn model from an assembly of fibers, each of the fibers being represented as a uniform tubular structure with empirically-determined mechanical properties;
simulating deformations of the yarn model by applying one or more strains selected from the group consisting of stretching, compressing, twisting, and bending, and calculating resulting stresses; and
homogenizing the yarn model of the assembly of fibers to produce a homogeneous representation of the yarn material ("YMM") as a uniform element, wherein mechanical properties of the YMM approximate those simulated using the yarn model of the assembly of fibers.

2. A method according to claim 1 wherein homogenizing the yarn model comprises: training a neural network using the strains applied and stresses calculated; and using the neural network to provide at least a portion of the YMM.

3. A method according to claim 2 wherein the method further comprises the step of validating the YMM by comparison of predicted behavior of the YMM with further simulations of the strains applied to the yarn model and stresses calculated therein.

4. A method according to claim 1, wherein the simulating deformations step is performed using finite element analysis of the yarn model, the yarn model comprising an assembly of fiber elements, each fiber element being represented as having cylindrical geometry filled with at least six 3-D brick finite elements.

5. A method according to claim 2 wherein the simulating is performed using finite element analysis of the yarn model, the yarn model comprising an assembly of fiber elements, each fiber element being represented as having cylindrical geometry filled with at least six 3-D brick finite elements, and wherein using the neural network to provide at least a portion of the YMM includes using a neural network that includes program code designed to interface with a finite element analysis software package.

6. A method according to claim 5 wherein using the neural network that includes program code designed to interface with a finite element analysis software package includes using a neural network that includes program code designed to interface with a finite element analysis software package selected from the group consisting of: ABAQUS, LS-DYNA, ANSYS, ADINA, MARC, and Nastran.

7. A method according claim 1, wherein generating a yarn model from an assembly of fibers, each fiber being represented as a uniform tubular structure with empirically-determined mechanical properties includes generating a yarn model from an assembly of fibers, each fiber being represented as a uniform tubular structure with empirically-determined mechanical properties comprising one or more characteristics selected from the group consisting of: fiber-fiber friction characteristics, results of mechanical tensile tests, fiber cross-section, average fiber length, and fiber density.

8. A method according to claim 7 wherein the mechanical tensile tests are carried out on a collection of at least two fibers.

9. A method according to claim 1, wherein homogenizing the yarn model to produce the YMM of the yarn material includes homogenizing the yarn model to produce a YMM having cylindrical geometry.

10. A method of generating a model of a fabric material suitable for use in finite element analysis, the method comprising:
generating a yarn model of a yarn material from an assembly of fibers, each of the fibers being represented as a uniform tubular structure with empirically-determined mechanical properties;
simulating deformations of the yarn model by applying one or more strains selected from the group consisting of stretching, compressing, twisting or bending, and calculating resulting stresses;
homogenizing the yarn model of the assembly of fibers to produce a homogeneous representation of the yarn material ("YMM") as a uniform element, wherein mechanical properties of the YMM approximate those simulated using the yarn model of the assembly of fibers;
generating a fabric model of a fabric weave unit cell from a number of yarns, each represented by the YMM;
simulating deformations of the fabric model by applying one or more strains selected from the group consisting of stretching, compressing, twisting, and bending, and calculating resulting stresses;

homogenizing the fabric model of the number of yarns to produce a homogeneous representation of the fabric material ("FMM") as a uniform element, wherein mechanical properties of the FMM approximate those simulated using the fabric model of the number of yarns.

11. A method according to claim 10, further comprising encasing the fabric model in a matrix material so as to form a unit cell of a model of a composite material.

12. A method according to claim 10 wherein homogenizing the yarn model comprises training a neural network using the strains applied to the yarn model and stresses calculated and using the neural network as the homogeneous representation of the yarn material; and wherein homogenizing the fabric model comprises training a neural network using the strains applied to the fabric model and the stresses calculated; and using the neural network as the homogeneous representation of the fabric material.

13. A method according to claim 12 further comprising validating the YMM by comparison of predicted behavior of the YMM with further simulations of the strains applied to the yarn model and stresses calculated therein.

14. A method according to claim 12 further comprising validating the FMM by comparison of predicted behavior of the FMM with further simulations of the strains applied to the fabric model and stresses calculated therein.

15. A method according to claim 10 wherein the simulating deformations of the yarn model includes using finite element analysis of the yarn model; and the simulating deformations of the fabric model includes using finite element analysis of the fabric model.

16. A method according to claim 15 wherein the yarn model comprises an assembly of fiber elements, each fiber element being represented as having cylindrical geometry filled with at least six 3-D brick finite elements.

17. A method according to claim 15 wherein generating the fabric model includes generating a fabric model comprising a weave of yarns, each yarn of the weave of yarns being represented by a cylindrical YMM.

18. A method according to claim 15 wherein the using the finite element analysis of the yarn model includes using a software package selected from the group consisting of: ABAQUS, LS-DYNA, ANSYS, ADINA, MARC, and Nastran; and the using the finite element analysis of the fabric model includes using a software package selected from the group consisting of: ABAQUS, LS-DYNA ANSYS, ADINA, MARC, and Nastran.

19. A method according to claim 10 wherein homogenizing the fabric model to produce the FMM includes homogenizing the fabric model to produce an FMM that comprises a shell finite element.

20. A method according to claim 10 wherein generating the yarn model from the assembly of fibers, each fiber being represented as a uniform tubular structure with empirically-determined mechanical properties, includes generating a yarn model from an assembly of fibers, each fiber being represented as a uniform tubular structure with empirically-determined mechanical properties of the fiber that comprise one or more characteristics selected from the group consisting of: fiber-fiber friction characteristics, results of mechanical tensile tests, fiber cross-section, average fiber length, and fiber density.

21. A method according to claim 10 wherein the FMM is used as a finite element model for input to a finite element analysis tool for simulating textile characteristics.

22. A method of assessing the suitability of a textile fabric for fabrication as a technical material, the method comprising:

(a) generating a first homogeneous representation of a fabric material ("FMM") comprising:
  (i) generating a yarn model from an assembly of fibers, each of the fibers being represented as a uniform tubular structure with empirically-determined mechanical properties;
  (ii) simulating deformations of the yarn model by applying one or more strains selected from the group consisting of stretching, compressing, twisting, and bending, and calculating resulting stresses;
  (iii) homogenizing the yarn model of the assembly of fibers to produce a homogeneous representation of the yarn material ("YMM") as a uniform element, mechanical properties of the YMM approximating those simulated using the yarn model of the assembly of fibers;
  (iv) generating a fabric model of a fabric weave unit cell from a number of yarns, each represented by the YMM;
  (v) simulating deformations of the fabric model by applying one or more strains selected from the group consisting of stretching, compressing, twisting, and bending, and calculating resulting stresses; and
  (vi) homogenizing the fabric model of the number of yarns generated above to produce the first FMM as a uniform element, mechanical properties of the first FMM approximating those simulated in the fabric model of the number of yarns;
(b) varying at least one characteristic of the fiber or yarn or weave used in generating the first FMM and repeating steps (i) to (vi) above to generate a second FMM incorporating the varied characteristic;
(c) using the first and second FMMs generated in steps (a) and (b) above in respective finite element (FE) simulations of the technical material;
(d) optionally repeating steps (b) and (c) for subsequent FMMs; and
(e) comparing performance of the respective technical materials simulated using each FMM.

23. A method according to claim 22 wherein the using the first FMM in the FE simulation of the technical material includes using the first FMM in a FE simulation of a vehicle airbag, the vehicle airbag being the technical material.

24. A computer arranged to model a yarn material suitable for use in finite element analysis, the computer comprising:
an interface for user-operated input of pre-determined fiber mechanical properties and yarn twist and length information;
a yarn modelling module for generating a yarn model from an assembly of fibers, each of the fibers being represented as a uniform tubular structure that is responsive with the pre-determined fiber properties;
a yarn simulation module for simulating deformations of the yarn model by applying one or more strains selected from the group consisting of stretching, compressing, twisting, and bending, and calculating resulting stresses; and
homogenizing means arranged to produce a homogeneous representation of the yarn material ("YMM") as a uniform element, mechanical properties of the YMM approximating those output from the yarn simulation module.

25. A computer according to claim 24 wherein the homogenizing means comprises: a yarn training module for training a neural network using the strains applied and stresses calculated by the yarn simulation module; and a YMM memory unit for storing details of the trained neural network, which thereby represent mathematically the YMM.

26. A computer arranged to assess the mechanical properties of a textile material, the computer comprising:
- an interface for user-operated input of pre-determined fiber mechanical properties, yarn twist and length information, and fabric weave and composite information;
- a yarn modelling module for generating a yarn model from an assembly of fibers, each fiber being represented as a uniform tubular structure that is responsive with the pre-determined fiber properties;
- a yarn simulation module for simulating deformations of the yarn model by applying one or more strains selected from the group consisting of stretching, compressing, twisting, and bending, and calculating resulting stresses;
- first homogenizing means arranged to produce a homogeneous representation of the yarn material ("YMM") as a uniform element, mechanical properties of the YMM approximating those output from the yarn simulation module;
- a fabric modelling module for generating a fabric model of a fabric weave unit cell from a number of yarns, each represented by the YMM;
- a fabric simulation module for simulating deformations of the fabric model by applying one or more strains selected from the group consisting of stretching, compressing, twisting, and bending, and calculating resulting stresses; and
- second homogenizing means arranged to produce a homogeneous representation of the fabric material ("FMM") as a uniform element, mechanical properties of the FMM approximating those output from the fabric simulation module.

27. A computer-readable medium embodying instructions for a processor, the instructions relating to building up a model of a yarn material, the computer readable medium comprising:
- (a) program code for generating a yarn model from an assembly of fibers, each fiber being represented as a uniform tubular structure with empirically-determined mechanical properties;
- (b) program code for simulating deformations of the yarn model by applying one or more strains selected from the group consisting of stretching, compressing, twisting, and bending, and calculating resulting stresses; and
- (c) program code for homogenizing the yarn model of the assembly of fibers to produce a homogeneous representation of the yarn material ("YMM") as a uniform element, mechanical properties of the YMM approximating those simulated using the yarn model of the assembly of fibers.

* * * * *